United States Patent [19]

Bournas

[11] Patent Number: 5,751,970
[45] Date of Patent: May 12, 1998

[54] METHOD FOR DETERMINING AN OPTIMAL SEGMENTATION SIZE FOR FILE TRANSMISSION IN A COMMUNICATIONS SYSTEM

[75] Inventor: Redha Mohammed Bournas, Chapel Hill, N.C.

[73] Assignee: International Business Machines Corp., Armonk, N.Y.

[21] Appl. No.: 689,473

[22] Filed: Aug. 8, 1996

[51] Int. Cl.$^6$ ...................................................... G06F 13/42
[52] U.S. Cl. ........................................ 395/200.66; 370/470
[58] Field of Search ...................... 395/200.66; 370/238, 370/470, 472, 401

[56] References Cited

PUBLICATIONS

Shinnai et al., Sensitivity Analysis of Optimal Message Size for File Transfer via Satellite and Terestrial Lnks, IEEE, pp. 225–232, Dec. 1988.

Moldeklev et al., How a large ATM MTU Causes Deadlocks in TCP Data Transfers, IEEE, pp. 409–421 Aug. 1995.

Comer, Douglas E., Internetworking with TCP/IP; vol. 1, Prentice Hall, Inc, 12.13 Maximum Segment Size Option, pp. 185–186 Dec. 1991.

*Primary Examiner*—Richard L. Ellis
*Assistant Examiner*—Patrice L. Winder
*Attorney, Agent, or Firm*—Jeanine S. Ray-Yarletts

[57] ABSTRACT

A method for determining optimum segment size in a data transmission system which uses a communications network that imposes a Maximum Transferable Unit (MTU) data packet size. The total cost (host processing plus transmission) is determined for a segment equal in size to the MTU. This cost is sequentially compared to the total cost of segments which are integer incremented multiples of the MTU. When the comparison indicates that the segment which is an integer multiple of the MTU exceeds the total cost of transferring the segment equal in size to the MTU, the comparison is terminated and the segment size is set equal to the segment size of the next prior comparison.

4 Claims, 2 Drawing Sheets

METHOD FOR DETERMINING AN OPTIMAL SEGMENTATION SIZE FOR FILE TRANSMISSION IN A COMMUNICATIONS SYSTEM

This invention relates to data communications in general and more particularly to optimizing the selection of segment size for the transfer of large files via transmission protocols such as TCP/IP in order to reduce the overall data processing cost of the file transfer at the host file site.

BACKGROUND

Packet data transmission networks limit the maximum packet size or Maximum Transferable Unit (MTU) that a user can deliver to the network. It is common practice to use the network MTU as the segment size of the transport layer for transferring large files, that is files which exceed the network MTU.

In the case of large files, this practice results in large overhead cost at the host system where the file is stored. Not only does each segment require substantial overhead when transmitted but each acknowledgement of the transmitted segments doubles the overhead since the overhead is the same regardless of the size of the data transfer.

There has been a universal reluctance to increase the segment size above the network MTU and divide the segment into two or more fragments. This reluctance stems from the fact that transmission protocols such as TCP/IP retransmit the entire segment if any fragment is lost or encounters an error thus rendering the apparent savings at the host system of questionable value since the network communication processing costs rise as the segment size increases due to retransmission of entire segments when a single fragment is lost or is in error.

SUMMARY OF THE INVENTION

The invention contemplates a method for determining and selecting an optimum segment size for transferring data across a data transmission network which limits data packet sizes to a Maximum Transferable Unit (MTU) and has a given probability of a successful packet transmission. The costs of transferring a segment equal in size to the MTU is sequentially compared to the costs of transferring segments which are integer incremented multiples of the MTU. When the comparison indicates that the cost of the incremented segment exceeds the cost of transferring the segment equal in size to the MTU, the sequential comparison is halted and the segment size derived in the next previous comparison is used for transferring the data.

BRIEF DESCRIPTIONS OF THE DRAWINGS

DETAILED DESCRIPTION OF THE INVENTION

Figure 1:
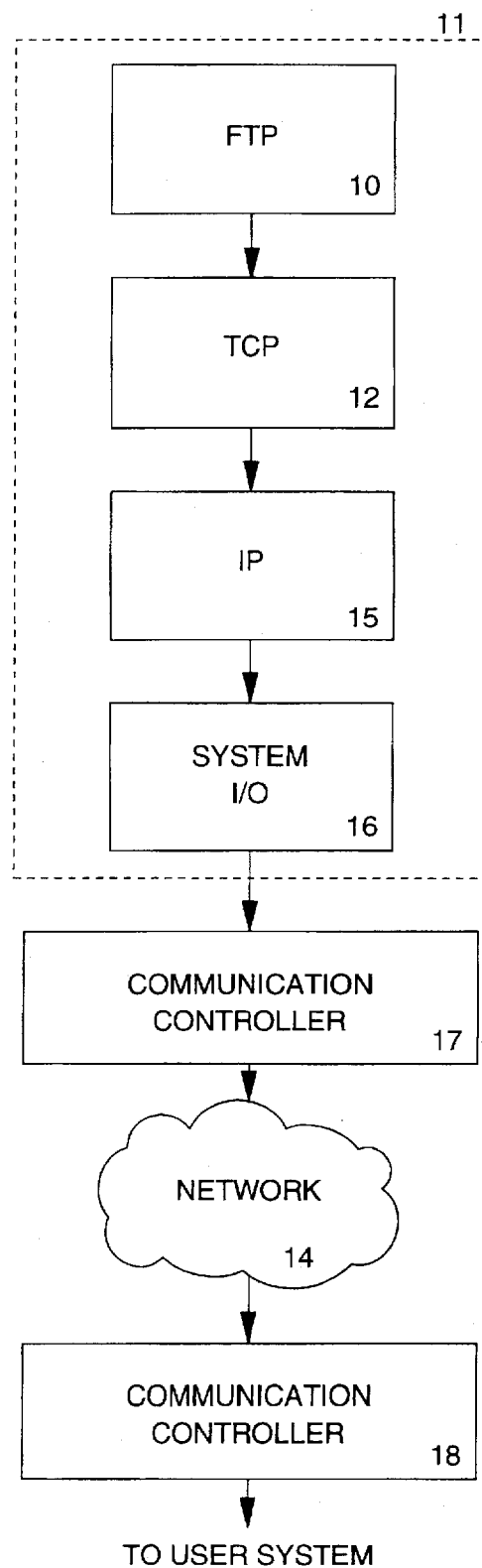
FIG. 1 is a block diagram of data flow in the contemplated system.
Figure 2:
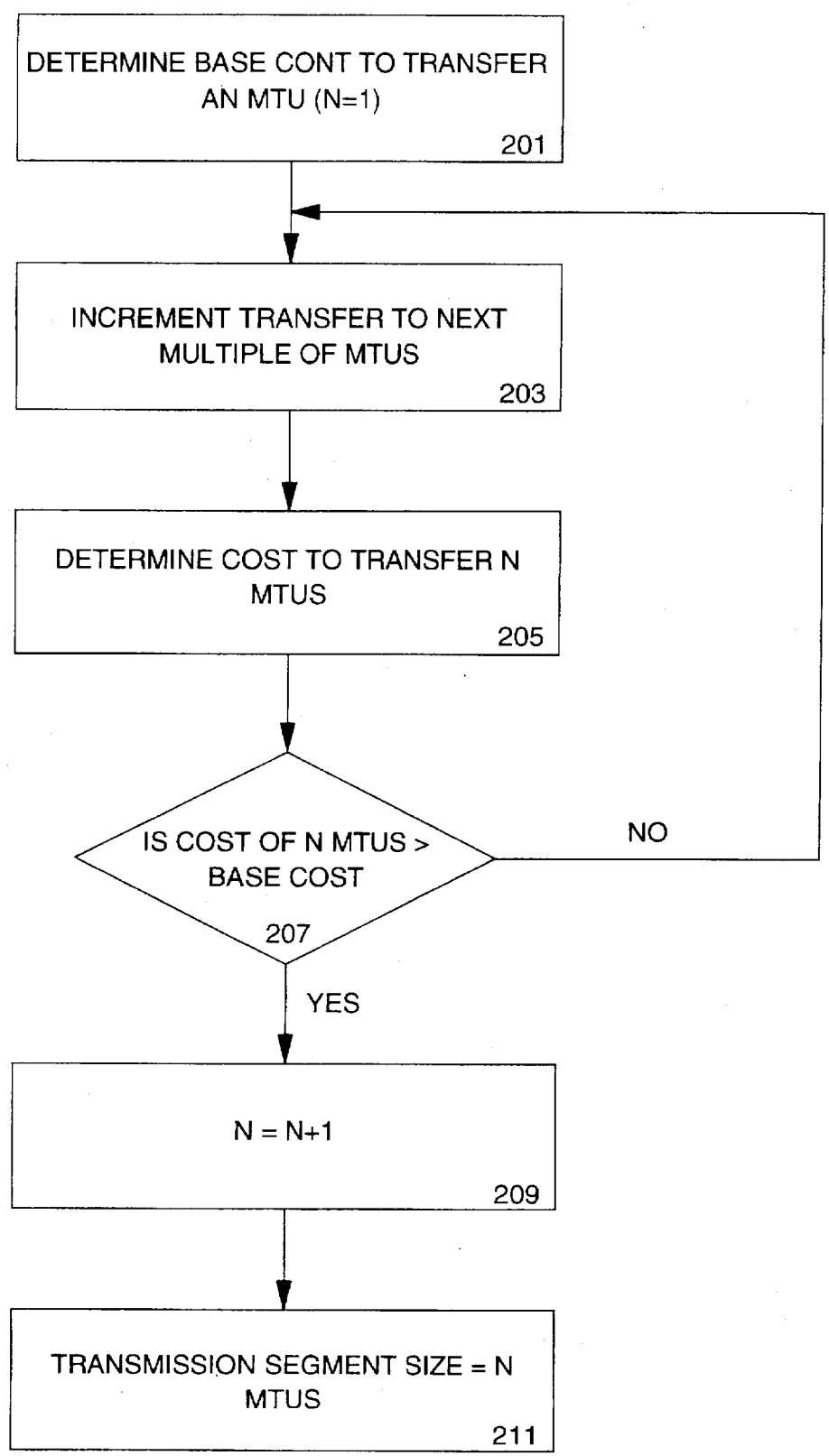
FIG. 2 is a flow diagram depicting the method of determining the optimal segment size for MTU transmission.

In FIG. 1, in response to requests received from users via a communication network, a File Transfer Protocol (FTP) module 10 resident in a host computer 11 hands a requested file to a Transmission Control Protocol (TCP) module 12. The TCP module 12 must segment the file if it exceeds the Maximum Transferable Unit (MTU) size specified by the network 14 which interconnects the host computer 11 to the user system not shown.

The TCP module transfers one segment at a time to an Internet Protocol (IP) 15 which transmits the segment or the fragments comprising the segment to the user via computer 11's System I/O 16, a locally connected communication controller 17, the network 14 and a remote communication controller 18 located at the user premises and connected to the user system not shown.

If the segment is made larger than the network MTU to reduce the overhead at the host system 11, errors in a fragment or a lost fragment involve retransmission of the entire segment resulting in an increase in the transmission cost which under certain circumstances could wipe out or exceed any savings experienced at the host system.

The file transfer process is set forth below in summary form.

1. Data is read from disk by the (FTP) layer and transferred in blocks of equal size to the TCP layer for processing.
2. The TCP layer then encapsulates the data into segments of equal size, calculates the checksum of the data (for data transmission integrity), prepares a TCP header and passes control to the IP layer.
3. The IP layer, depending on the size of the segment and the header, breaks (if necessary) each TCP segment into IP datagrams of equal size, adds a header and invokes the network layer for transmission to the destination via the network. If the segment size is less than the MTU by an amount sufficient to accommodate all the required headers, IP can send it as a single datagram.

The amount of user data in the network packet is equal to the MTU size less the TCP, IP and network headers. The receiver TCP, upon successful receipt of a segment sends an acknowledgement to the sender TCP.

For a given amount of data (an amount greater than the network MTU) to be transferred, the host data processing cost decreases as the segment size increases. On the other hand the cost related to transmission, increases as the segment size increases in integer multiples of the MTU size. At some integer (n) multiple of the MTU the increased cost of transmission will exceed the reduction in the host data processing cost resulting from an increase in the segment size. At this point it is necessary to step back one integer to achieve optimal total savings.

Listed below are typical cost factors which may vary from one application to another:

1) B(bytes): Size of data block transfer between FTP and TCP.
2) p(bytes): MTU (maximum network packet size).
3) np: TCP segment size where n is an integer value.
4) a: TCP processing cost per segment (instructions).
5) ip: IP processing cost per IP fragment (instructions).
6) b=ip+io where io is the input/output (10) processing cost.
7) c: TCP, IP and I/O processing cost per TCP acknowledgement (instructions).
8) y=1−q: Probability of a successful packet transmission, where q is the probability of a packet transmission error.

As noted above, increasing the segment size by integer multiples of the MTU size, reduces the host processing cost and increases the transmission cost. When an integer increase in the segment size causes the increase in transmission costs to exceed the reduction in host processing costs, the total costs are increased. While this results in a reduction of the host processing cost it impacts overall costs adversely and must be avoided.

Segments equal to the MTU are endowed with unique characteristics. That is, the segment has the lowest transmission cost and the highest host processing cost. In order to arrive at an optimal segment size one need only compare, in succession, the total costs incurred when the segment size is made equal to the MTU(201), to the total cost of segments n(MTU)(205) for values of n greater than 1 (203) until the total cost of the larger segment exceeds the total cost of the segment equal to the MTU(207) and then reduce the segment size by MTU(209). This may be expressed as:

Dn=Cn−C where C is the total host plus transmission cost of a segment equal to the MTU and Cn is the total host plus transmission cost of a segment n(MTU). At this point the next smaller segment size ((nlast-1) MTU) is the optimum segment size and yields the lowest total cost.

The difference Dn can be computed directly $$Dn = \frac{B}{npy^n} \{a(n-1)y^n + n(b+c)y^{-1} - n \cdot b - c\}$$

The iterative process described above can be avoided if an approximate optimal value of n is suitable. In this instance the buffer size of the host system I/O 16 must be at least twice the size of the MTU. Then for all network reliability factors y equal to or greater than 0.75, an approximation of the optimal value n is given by:

$$\tilde{n} = \frac{\log_Y + \sqrt{(\log_Y)^2 - 4\log_Y}}{-2\log_Y}$$

The value of n must be an integer value. It is most unlikely that the calculation will result in an integer value and in those instances where it does not, the next higher value should be selected since it will generally yield the best result. However, the next lower integer value could also be selected without experiencing a substantial impairment in result.

While several embodiments of the invention have been described in detail, it will be apparent to those skilled in the art that changes can be made without departing from the spirit and scope of the invention.

I claim:

1. In a host data processing system including a file transfer protocol handler, a transmission control protocol handler, an internetwork protocol handler and a system input/output for connecting the system to a remote user by a communication network having a predetermined Maximum Transmission Unit (MTU) size and a given probability y of a successful MTU transmission, a method for determining and selecting an integer multiple n of the MTU which yields an optimum transmission segment size comprising the steps:

determining a base cost to transfer transmission segments equal in size to the MTU;

determining and comparing in sequence the cost to transfer transmission segments equal in size to n.MTU where n is an integer greater than 1 and is incremented by 1 for each sequential comparison to the said base cost;

discontinuing the said sequential determination and comparison when a comparison indicates that the base cost is exceeded by the current sequential cost; and, decreasing the last value of n by 1 and selecting the transmission segment size at the value (n−1).MTU.

2. In a host data processing system including a file transfer protocol handler (FTP), a transmission control protocol handler (TCP), an internetwork protocol handler (IP) and a system input/output (I/O) for connecting the system to a remote user by a communication network having a predetermined Maximum Transmission Unit (MTU) size and a given probability y of a successful MTU transmission, a method for determining and selecting an integer multiple n of the MTU which yields an optimum transmission segment size comprising the steps:

determining in sequence the difference between the cost to transfer transmission segments equal in size to the MTU and the cost to transfer transmission segments equal in size to n.MTU where n is an integer greater than 1 and is incremented by 1 for each sequential comparison according to the relationship, $$Dn = \frac{B}{npy^n} \{a(n-1)y^n + n(b+c)y^{-1} - n \cdot b - c\}$$

where:

B (bytes): Size of data block transfer between FTP and TCP (bytes): MTU size np: TCP segment size where n is an integer a: TCP processing cost per segment ip: IP processing cost b=ip+io where io is the Input/Output (I/O) processing cost c: TCP, IP and I/O processing cost per TCP acknowledgement y: probability of a successful packet transmission;

interrupting the sequential determination of the difference when the incremented value of n causes the difference to change signs; and, decrementing the last attained value of n by 1 and selecting the transmission segment size to be equal to the MTU times the decremented value of n.

3. In a host data processing system including a file transfer protocol handler, a transmission control protocol handler, an internetwork protocol handler and a system input/output for connecting the system to a remote user by a communication network having a predetermined Maximum Transmission Unit (MTU) size, a method for determining and selecting an integer multiple n of the MTU which yields an approximation of the optimum transmission segment size comprising the steps:

determining the probability y=1−q (where q is the probability of an MTU transmission error) of a successful MTU transmission;

determining an approximate value for n according to:

$$n = \frac{\log_Y + \sqrt{(\log_Y)^2 - 4\log_Y}}{-2\log_Y}$$

:and, selecting a transmission segment size equal to MTU times an integer value n which is derived by rounding the value n.

4. The method set forth in claim 3 in which the value n is rounded up.

* * * * *